United States Patent Office 2,866,059
Patented Dec. 23, 1958

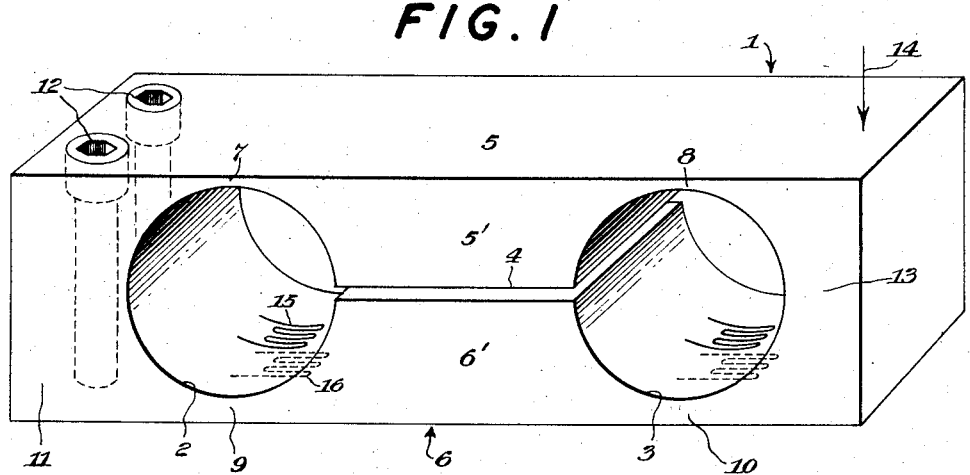

2,866,059

SLOTTED TYPE MULTIPLE BENDING BEAM

Eric Laimins, Cambridge, Mass., assignor to Baldwin-Lima-Hamilton Corporation, a corporation of Pennsylvania Application June 1, 1956, Serial No. 588,775

5 Claims. (Cl. 201—63)

This invention relates to force measuring load cells of the multiple bending beam type employing strain sensitive means for measuring the applied force.

Bending beam devices of this type are particularly useful where maximum strain output is desired with less deflection than would be the case with a single beam. Two parallel beams are generally employed with their corresponding ends rigidly secured together whereby when one end is anchored on a suitable structure the other end is allowed to move freely and, while flexing, the beams remain in parallelism in the nature of a parallelogram even though the beams, due to their ends being fixed together, may assume a slightly S-shaped curvature. Devices of this type as heretofore constructed have not been adequate for measuring extremely small loads with a high strain output and also their cost of manufacture has been too great.

It is an object of my invention to provide an improved multiple bending beam type of force measuring device having a novel construction for producing a high strain output for a given load and that is conducive to low cost manufacture while at the same time having a high degree of accuracy, sensitivity and response especially in the measurement of very small load forces.

Other objects and advantages will be more apparent to those skilled in the art from the following description of the accompanying drawings in which:

Fig. 1 is a perspective of the preferred form of my invention; and

Fig. 2 is a side elevation of a modified form.

In the particular embodiments of the invention, as disclosed herein for purposes of illustration, my improved beam 1 is formed by taking a solid elongated bar of any desired material and preferably of rectangular shape and then drilling two, preferably equal diameter, holes 2 and 3 crosswise of the bar. A straight slot 4 is suitably machined as by milling to connect the two holes thereby providing an upper beam 5 and a lower beam 6. The slot 4 is preferably, but not necessarily, formed along a plane containing the axes of the holes 2 and 3 but, in any event, the position of the slot is such as to provide horizontally extending rigid portions 5' and 6' between the upper and lower halves of the two holes. The holes are drilled with their axes lying in a common plane which is substantially parallel to the top and bottom surfaces of the beam 1 and, in the form shown in Fig. 1, are displaced upwardly a sufficient distance so that relatively thin flexure sections 7 and 8 are provided for the upper beam 5 and relatively heavy strain sensitive sections 9 and 10 are formed for the beam 6. The holes are also disposed inwardly from the ends of the beam 1 so that a relatively heavy end base 11 may be suitably anchored to a structure as, for example, by stud bolts 12 or other suitable means while the other end of the beams are rigidly connected together by a heavy section 13. The rigid ends 11 and 13 thus hold the two beams 5 and 6 in parallelism at all times during flexure thereof upon application of a load to the free end of the beam as indicated by the arrow 14.

Electrical impedance strain gage means, preferably in the form of bonded wire type strain gages 15 are secured to the bottom surface of holes 2 and 3 at their lowermost area, this area having a high strain concentration because of the thickness of flexible portions 9 and 10. If desired, strain gages 16 may be bonded to the bottom surface of the beam adjacent areas 9 and 10 and, preferably, immediately beneath the gages 15. Under load the strain induced in gages 15 is appreciably greater than that of gage 16 which is a distinct advantage. As is well known, the change in electrical resistance of the wire filaments of these gages in response to strain induced by an applied load is measured by any suitable instrument of the Wheatstone bridge or other type. The strain is concentrated within the areas 9 and 10 by reason of the portions 7 and 8 being relatively thin so that the upper beam 5 functions solely as a flexure guide plate to maintain the heavy connecting end 13 in a vertical position during its movement in response to load 14. By maintaining the end 13 vertically the beams assume a slightly S-shape during flexure thereby reducing the deflection of the beam without decreasing the strain sensitivity of the beam.

In the modification of Fig. 2 the holes are drilled symmetrically between the top and bottom of the beam thereby producing top and bottom strain areas 18 and 19 of equal thickness. In this case gages 20 and 21 are placed on the inside of one or both holes at both the top and bottom thereof. This arrangement of equal thicknesses is particularly useful where circumstances require a very narrow beam which is especially effective for measuring extremely small forces with minimum deflection. If desired, gages such as 16 may also be added.

From the foregoing disclosure it is seen that I have provided an extremely simple yet highly effective multiple bending beam having a high degree of strain output with minimum deflection for measuring very small forces or with minimum deflection, as in Fig. 1, for measuring larger forces, these beams being so constructed and arranged that they can be manufactured at a very low cost without sacrificing in any way the accuracy, sensitivity and responsiveness of this type of device.

It will, of course, be understood that various changes in details of construction and arrangement of parts may be made by those skilled in the art without departing from the spirit of the invention as set forth in the appended claims.

I claim:

1. A force measuring device comprising, in combination, an elongated member having two transverse holes connected by a slot so as to provide upper and lower beams having flexible portions adjacent the top and bottom of the holes and relatively rigid longitudinal sections between the upper halves of each hole and between the lower halves of each hole, said holes being disposed inwardly of the ends of the member so as to provide end portions rigidly connecting the corresponding ends of the beams together, means for anchoring one of the rigid ends as a base and the other end being free to move by flexure of the beams upon application of a force at said free end, and means for sensing the deflection of the beams to determine the applied force.

2. The combination set forth in claim 1 further characterized in that the holes are substantially circular and the axes of the holes are offset to one side of the center line of the member whereby the flexible portions of one of the beams is of greater thickness than the flexible portions of the other beam, and the means for sensing the deflection are connected to one of the thicker flexible portions.

3. The combination set forth in claim 1 further characterized in that the longitudinal center line of the slot lies substantially on the axes of the holes.

4. The combination set forth in claim 1 further characterized in that the holes are substantially circular and the deflection sensing means comprises a bonded filament type strain gage secured to the curved surface of at least one of the holes at the area thereof that is most adjacent to the outside of the beam which is its flexible portion.

5. The combination set forth in claim 1 further characterized in that the holes are placed substantially symmetrically between the top and bottom of the elongated member so as to provide flexible portions of substantially equal thickness adjacent the top and bottom of each hole.

References Cited in the file of this patent

UNITED STATES PATENTS 2,597,751   Ruge ------------------ May 20, 1952

OTHER REFERENCES

An Adjustable-Range Force Measuring Spring, The Iron Age, Sept. 20, 1945 (p. 63).

Abbot: Some Applications of Strain Gages in Aeronautical Research, AGARD Memorandum AG2/MI, Advisory Group for Aeronautical Research and Development, Palais de Chaillot, Paris, France (pp. 14, 24 and 25).